United States Patent

Strohm et al.

[11] Patent Number: 6,159,369
[45] Date of Patent: *Dec. 12, 2000

[54] PROCESS FOR THE PARTIAL MODIFICATION OF POROUS, HYDROPHILITIC FILTER MEMBRANES, OF FILTER MEMBRANES TREATED IN SUCH MANNER AND FILTER MODULES EQUIPPED WITH SUCH FILTER MEMBRANES, ESPECIALLY FILTER CARTRIDGES

[75] Inventors: Gerhard Strohm, Dexheim; Hans-Joachim Müller, Bad Kreuznach; Markus Kirschner, Mainz; Udo Holzki, Wörrstadt, all of Germany

[73] Assignee: Seitz-Filter-Werke GmbH und Co., Bad Kreuznach, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/646,268
[22] PCT Filed: Nov. 4, 1994
[86] PCT No.: PCT/EP94/03627
  § 371 Date: Jul. 25, 1996
  § 102(e) Date: Jul. 25, 1996
[87] PCT Pub. No.: WO95/14525
  PCT Pub. Date: Jun. 1, 1995

[30] Foreign Application Priority Data

Nov. 23, 1993 [DE] Germany .............................. 43 39 810

[51] Int. Cl.⁷ .................................................. B01D 63/00
[52] U.S. Cl. ............................... 210/500.41; 210/500.27; 210/321.6; 264/48; 264/49

[58] Field of Search ............................... 210/490, 500.41, 210/500.29, 500.38, 500.42, 500.27, 321.6; 264/48, 49

[56] References Cited

U.S. PATENT DOCUMENTS

| 4,919,809 | 4/1990 | Yamamoto et al. | 210/500.23 |
| 5,376,274 | 12/1994 | Muller et al. | 210/500.41 |
| 5,436,068 | 7/1995 | Kobayashi et al. | 210/500.41 |
| 5,543,465 | 8/1996 | Bell et al. | 210/500.38 |

*Primary Examiner*—Ana Fortuna
*Attorney, Agent, or Firm*—Henderson & Sturm LLP

[57] ABSTRACT

Process for the partial modification of porous, hydrophilitic filter membranes, of filter membranes treated in such manner and filter modules equipped with such filter membranes. When hydrophilic filter membranes are embedded in hydrophobic securing components of filter modules, the membrane filters are hydrophobized beyond the embedding area in an edge region, so that this edge region, that can no longer be wetted by water, forms an air by-pass when the filter modules are tested, rendering thus impossible that the filter modules can be tested. The novel process is intended to modify the edge regions in such a manner that, even after partial areas have been embedded in a hydrophobic polymer material, they remain porous and hydrophilic over the whole of their effective area. The porous filter membranes are soaked in a solution of hydrophilizing agent in the areas intended to be embedded, so that the filter membranes are saturated with solution in the thus predetermined areas, and the thus treated filter membranes are immediately washed and dried. Through this process, the modified edge regions are several times more hydrophilic than the untreated areas in the filter membranes, so that the membrane areas in the filter modules in direct contact with the securing components still remain sufficiently hydrophilic.

7 Claims, No Drawings

PROCESS FOR THE PARTIAL MODIFICATION OF POROUS, HYDROPHILITIC FILTER MEMBRANES, OF FILTER MEMBRANES TREATED IN SUCH MANNER AND FILTER MODULES EQUIPPED WITH SUCH FILTER MEMBRANES, ESPECIALLY FILTER CARTRIDGES

TECHNICAL FIELD

The present invention relates to a process for the partial modification of porous, hydrophilic filter membranes, in particular for micro- and ultrafiltration, pursuant to the introductory clause of claim 1. The present invention relates also to filter membranes treated subsequently in such manner and filter modules equipped with such filter membranes, especially filter cartridges.

BACKGROUND ART

Porous filter membranes are produced from many different thermoplastic materials, such as those based on cellulose derivatives, polyamides or polysulfones, that present many different pore sizes and pore size distributions, and that can be either symmetrical or asymmetrical as well as hydrophilitic or hydrophobic. EP 96 306 describes such filter membranes.

Such filter membranes are frequently brittle, have low stability under loads, and are susceptible to tearing or tear propagation, so that problems occur with their handling or their mounting into filter modules, such as filter cartridges. Modifications of the physical properties within and immediately outside of the securing area can occur particularly when filter membranes are secured in a pleated manner, e.g., in filter cartridge housings, be it through embedding in cold- or hot-setting multicomponent resins or through embedding in smelts of synthetic thermoplastics and the subsequent hardening of the sealing material. By way of example, a hydrophobization of hydrophilic membranes can thus occur. When embedding hydrophilic filter membranes, such as, e.g. nylon membranes, into hydrophobic retaining elements, such as, e.g., end caps out of polypropylene, polysulfone or polyethylene, the membrane filter edges are hydrophobized beyond the embedding region, so that this edge region, that is no longer wettable by water, contains a large number of pores which, when subjected to the bubble-point test or the pressure resistance test (integral test) of, for example, the filter cartridge, represent an air by-pass, thus making it impossible to test the filter cartridge.

In EP 96,306, the sealing of the borders of hydrophilic membrane filters is described, such a nylon filters, by means of heat-sealing polyester film that is provided on one of its sides with a solvent-free polyethylene coating as fusion adhesive. It is also mentioned that it is possible to obtain a decreased porosity at the border strips of membrane filters by compressing them mechanically, which results in a collapsing of the micro- or ultraporous filter matrix over the whole of the filter thickness.

In DE-OS 38 03 341 and EP 03 27 025, porous membrane filters are described which, on the basis of a conversion of the structure on one side of the membrane into a film-like state, present fluid-impervious spots. The liquidity of the membrane material is obtained by having steam of a solvent or of a solvent mixture for the membrane filter material act directly upon the spot to be liquified on one side of the membrane filter, so that the membrane filter material is dissolved to the desired depth. Thermal processes are also described, but all processes have the disadvantage that obtaining the one-sided sealing is technologically very difficult, that the membrane's morphology is affected, and, at least not on the side of the membrane to be coated, that no complete securing of the embedding mediums takes place.

Beside a "heat seal" and a mechanical process, EP 00 36 315 makes mention of a process in which the sensitive region of the porous filter membranes is treated by pouring with an adhesive substance. The disadvantage of this process is the insufficient temperature stability of the glued membrane region being exposed to repeated steam cycles at 134° C.

All that the above-mentioned processes have in common is that in the regions to be embedded the membrane is absolutely impervious on one or on both sides, that is to say, that the surface is sealed in such a manner that hydrophobic embedding material cannot penetrate anymore into the membrane.

Patent JP-A-3012223 describes a process in which the end areas of hydrophobic hollow fiber membranes are first subjected to an oxidizing treatment, for the adhesive joining the hollow fiber membranes to adhere more firmly.

The patent JP-A-3086206 describes a process for the production of pleated hydrophobic membranes, of which the end regions are embedded in a thermoplastic synthetic material. All other areas, excepting these end regions, are soaked in a hydrophilizing agent.

SUMMARY OF THE INVENTION

Accordingly, the task of the present invention is the preparation of a process for the modification of hydrophilic filter membranes in such a manner that, even after partial regions have been embedded into hydrophobic polymeric material, they remain porous and hydrophilic over the entirety of their effective area, in addition to the preparation of such modified filter membranes, and a filter module equipped with such filter membranes, especially a filter cartridge.

DETAILED DESCRIPTION

The present invention intended to be claimed is a process for partial modification of porous, hydrophilic filter membranes, in particular for micro- and ultrafiltration, for the embedding of the modified areas in hydrophobic polymer material in filter modules, especially filter cartridges, wherein the process comprises soaking areas of a porous filter membrane intended to be embedded in hydrophobic polymer material with a solution of a hydrophilizing agent, so that the porous filter membrane is saturated with the solution in predetermined areas, and substantially immediately thereafter washing and drying the saturated filter membrane wherein prior to soaking the porous filter membrane is hydrophilic to such an extent that, after one minute of having been placed on a substantially still water surface at 25° C., a surface of the porous filter that had come into contact with water is substantially completely wetted with water.

For purposes of the present invention, the hydrophilizing agent comprises a member selected from the group consisting of polyvinyl pyrrolidone, a polyvinyl pyrrolidone-copolymer, a peroxodisulfate and mixtures thereof, in a sufficient amount dissolved in a water/ethanol mixture, so that hydrophilic, modified areas of the filter membrane exhibit a hydrophilicity at least twice as high as other areas of the filter membrane. Most preferably, the hydrophilizing agent is a mixture of polyvinyl pyrrolidone, a polyvinyl pyrrolidone-copolymer, and a peroxodisulfate.

In accordance with the present invention, the hydrophilizing agent comprises a weight percentage ratio of PVP/copolymer within a range of 1:9 to 9:1, total concentration of polyvinyl pyrrolidone+copolymer in the solution within a range of 1–8% in weight, and a weight percentage ratio (polyvinyl pyrrolidone+copolymer) of peroxodisulfate within a range from 4:1 to 1:4; and a ratio of water/ethanol in the solvent has a weight ratio with a range from 10:1 to 3:1.

In accordance with the present invention, the hydrophilizing agent comprises a weight percentage ratio of polyvinyl pyrrolidone/copolymer within a range of 1:2 to 2:1, total concentration of polyvinyl pyrrolidone+copolymer in the solution within a range of 2–4% in weight, and a weight percentage ratio (polyvinyl pyrrolidone+copolymer) of peroxodisulfate within a range from 2:1 to 1:2; and a ratio of water/ethanol in the solvent has a weight ratio in the range from 5:1 to 3:1.

In accordance with the present invention, the hydrophilizing agent comprises a weight percentage ratio of polyvinyl pyrrolidone/copolymer of 1:1, total concentration of polyvinyl pyrrolidone+copolymer in the solution of 3% in weight, a weight percentage ratio (polyvinyl pyrrolidone+copolymer) of sodium peroxodisulfate of 1:1; and a ratio of water/ethanol in the solvent presents a weight ratio of 4:1.

In one embodiment, the filter membrane comprises polysulfone as matrix material. In another embodiment, the filter membrane comprises aliphatic polyamide as matrix material. In yet another embodiment, the filter membrane comprises aromatic polyamide as matrix material. In still yet another embodiment, the filter membrane comprises a matrix material consisting of cellulose derivatives.

The process of the present invention, as described above, also involves subjecting the porous filter membrane to partial modification prior to subsequent treatment of the membrane filter.

The process of the present invention, as described above, also involves subjecting the porous filter membrane to partial modification at a pleated pile either before or after longitudinal seam soldering.

The process of the present invention, as described above, also involves subjecting the porous filter membrane to partial modification on a semi-finished product prior to embedding in a hydrophobic polymer material.

The present invention is also directed to a porous, hydrophilic filter membrane, especially for micro- and ultrafiltration, comprising predetermined areas of the filter membrane having inside walls with pores that are coated with such a material that the predetermined areas are hydrophilic, modified areas which are hydrophilic to such an extent that one minute after having been placed on a still water surface at 25° C., a surface of said filter membrane contacting said water is substantially completely wetted with water, wherein the hydrophilic, modified areas are more hydrophilic than other areas of the filter membrane, whereby differences of hydrophilicity may be observed for different penetration speeds of a water drop in the modified areas compared to other areas of the filter membrane.

In accordance with the present invention, the inside walls of the pores in the hydrophilic, modified areas are coated with a hydrophilic material to such an extent that the hydrophilic modified areas of the filter membrane are at least twice as hydrophilic as other not modified areas of the filter membrane.

The filter membrane in accordance with the present invention may include polysulfone, aliphatic polyamide, and/or aromatic polyamide as matrix material, or the matrix material may be based on cellulose derivatives.

The present invention is also directed to a filtration module comprising a filter membrane as otherwise described herein comprising modified areas embedded in securing components comprising hydrophobic polymer material, wherein securing components comprise end caps of filter cartridges. For purposes of the present invention, the securing components may comprise polypopylene, polysulfone and/or polyethylene.

In accordance with the process, the task is solved pursuant to the characteristics of claim 1; the filter membrane according to the invention is described in claim 2; and the filter module in claim 3. Advantageous embodiments are the subject-matter of the subclaims.

The porous, hydrophilic filter membranes, preferably with pore sizes for the micro- and the ultrafiltration range, may consist of polysulfones with admixtures of polyvinyl pyrrolidone, aliphatic and aromatic polyamides, or cellulose derivatives, and are produced by known processes according to the state-of-the-art.

Within the meaning of this invention, the membranes that are characterized as hydrophilic are those which, after being placed on a still water surface at ambient temperature (25° C.), upon visual examination after one minute, are completely wetted, that is to say, spotless, on the surface that came into contact with the water. In the case of asymmetric membranes the side of the separation layer is brought into contact with water. The area of the porous, hydrophilic filter membranes predetermined to be embedded are soaked with a solution of a hydrophilizing agent and subsequently dried.

The saturated area of the hydrophilic membrane, modified in accordance with the invention, should preferably be twice as hydrophilic as the untreated membrane areas. For this, the degree of hydrophilicity is determined by the difference of the penetration velocity of a water drop into a modified and a non-modified section of the membrane. The penetration velocity is determined in accordance with the process described in EP 0 245 000. Being the membrane in a horizontal direction, a water drop of 0.05 ml is applied at ambient temperature with a pipette to the surface of the membrane area to be determined, whereupon the time is measured by transmitted light after which the membrane becomes translucent in the area at which the water drop was applied. This optical transition occurs abruptly depending on the hydrophilicity of the pertinent membrane area, in the case of hydrophilic membranes, pursuant to above definition, within a time period between 1/10 to about 15 seconds. In this process, it is important that, prior to this determination, the membrane to be measured is subjected to a steam treatment, followed by complete drying. In accordance with this invention, in comparison with a not modified membrane area, a modified membrane area presents an n-th higher hydrophilicity, if the penetration time of a 0.05 ml drop, according to above measurement, amounts to only 1/n of the time that is measured for a drop of the same size in the not modified membrane area.

The German application 42 17 335 describes a permanently hydrophilic membrane, consisting of polysulfone. Within the meaning of this invention, pursuant to the definition of the U.S. Food and Drug Administration (21 CFR Ch.I (Apr. 1, 1989 edition), § 177.1560 to § 177.2450) also polyethersulfones and polyarylsulfones are understood as being polysulfones. Below, the definition of polysulfone subsumes the following compounds in every way:

weight ratio of 10:1 to 2:1, preferably 5:1 to 3:1, so that the total concentration of PVP+PVP-copolymer in the solvent mixture amounts to 1–8% in weight, preferably 2–4% in weight. Subsequently, peroxodisulfate is added until the weight percentage ratio of (polyvinyl pyrrolidone+PVP-copolymer) peroxodisulfate amounts to 4:1 to 1:4, preferably 2:1 to 1:2. The membrane areas subsequently treated therewith shall by at least twice as hydrophilic as the not treated areas.

The areas to be modified, preferably the edges of the hydrophilic membrane, are immersed at ambient temperature (25° C.) into the thus produced saturating bath as far as the membrane edges shall be subsequently embedded into the hydrophobic polymer material. If the membranes are immersed into the saturating bath while still wet, the saturation time should be at last 5 to about 60 seconds; in the case of previously dried membranes, the saturation time is reduced by at last 2 to 10 seconds. Subsequent to the Polysulfone

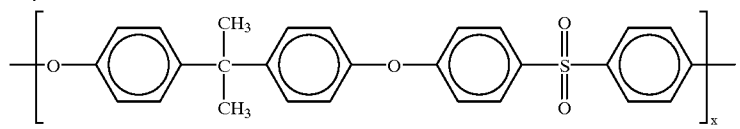

Polyethersulfone

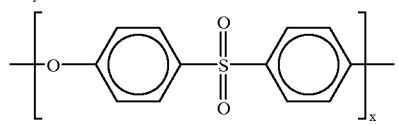

Polyarylsulfone
Copolymer out of:

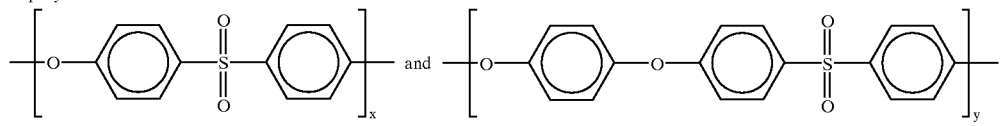

In accordance with the invention, the membranes can be subsequently treated as follows:

The hydrophilic membrane to be modified is soaked in a solution of a hydrophilizing agent with the area, preferably the edge region, intended to be embedded in the hydrophobic polymer material, such as, e.g., polypropylene, polysulfone or polyethylene. For this, the edge region of the membrane is immersed in a treatment bath.

The treatment bath (saturating bath) can consist of a solution of polyvinyl pyrrolidone, preferably with a mean molecular weight of 360,000, a polyvinyl pyrrolidone-copolymer and a peroxodisulfate, preferably as a sodium-, potassium- or ammonium salt in a mixture of water/alcohol. The saturating bath can be preferably prepared as follows:

Polyvinyl pyrrolidone is dissolved together with the polyvinyl pyrrolidone-copolymer which, on its part, is produced from 5–80% in weight of monomer parts of vinyl pyrrolidone and correspondingly 95–20% in weight of vinyl acetate, at a PVP/copolymer weight ratio of 1:9 to 9:1, preferably 1:2 to 2:1, in a mixture of water/ethanol with a saturating, the membrane is dried at a temperature ranging between 70 and 150° C., preferably 80–110° C., during a time period of up to 160 minutes, preferably 2 to 10 minutes.

When such after-treated membranes are embedded in hydrophobic polymer material, such as, e.g., when they are installed in filter cartridges, much care must be taken that only saturated areas are embedded. Therefore, as a precaution, about 5 to 20% of the saturated area should afterwards protrude from the hydrophobic embedding material to prevent in every instance that the hydrophobic polymer material con penetrate into the not modified membrane area. It is understood that the further hydrophilization attained by saturation shall be carried out prior to an eventual subsequent processing of the filter membranes, but it can take place at the pleated pile itself either before or after the longitudinal seam soldering. In any event, the additional hydrophilization of partial areas must be performed at the semi-finished product prior to the embedding into the end caps of a filter cartridge.

EXAMPLES

Hereafter, the invention is explained in more details by means of examples:

Example 1

A membrane made of aromatic polysulfone (mixture: 30 g polysulfone P 1800+0.6 g polyvinyl pyrrolidone (Kollidon K 90) in 100 g N-methyl pyrrolidone and 190 g polyethylene glycol (Pluriol 400)) is permanently hydrophilized through a 5-second immersion in a $H_2O$/EtOH solution (volumes ratio 4:1) made of 0.3% of polyvinyl pyrrolidone K 90 and 0.3% of a copolymer (vinylpyrrolidone/vinyl acetate at a ratio of 1:1) as well as 0.5% of sodium peroxodisulfate, and subsequently dried at 90° C. During the production process, the membrane is continuously cut at a predetermined width and rolled up on a plastic core. The membrane presents a blow point of 3.6 bar and a rate-of-flow of 16.7 ml ($cm^2$min bar). This coil is subsequently treated in an appropriate device in such a manner that the membrane coil is conveyed over an adequately designed saturating bath and a drum dryer, and then rolled up anew. The design of the saturating device is such that only about 2 cm of the left and the right edges of the membrane are treated with the saturating bath. The saturating bath is composed as follows:

1.5% in weight of polyvinyl pyrrolidone K 120
1.5% in weight of a copolymer, consisting of polyvinyl pyrrolidone and polyvinyl acetate at a weight ratio of 1:1; and
3% in weight of sodium peroxodisulfate The solvent consists essentially of 18.8% in weight of ethanol and 75.2% in weight of water.

Prior to the drying of the membrane, all stages of the process take place at ambient temperature (25° C.). The drum dryer has a temperature in the range of 95–110° C. The speed of the membrane path is adjusted in such a manner that after leaving the dryer, the membrane is completely dry (about 1.5–3 m/min).

Hydrophilic Test of the Modified Membrane

Samples for testing purposes are taken from the membrane produced according to Example 1, by punching out round disks with a 50-mm diameter from the membrane coil. The samples are taken in such a manner that they include saturated edge regions as well as not saturated membrane regions, so that the samples contain original as well as after-treated membrane surfaces. These samples are clamped into a filter holder and are subjected to a steam treatment during one-half hour at a pressure of 2 bar (121° C.) and a differential pressure of 0.2 bar. Subsequently, the membrane samples are fully dried at 110° C. in a drum dryer.

These dried samples are then used to measure the penetration velocity of a water drop into the individual areas of the membranes. For this, a water drop of about 0.05 ml is placed by a polypropylene pipette on the membrane surface which is kept substantially horizontal, and subsequently the time is measured by transmitted light after which the membrane becomes translucent in the area of the water drop.

Measured data:
Penetration time in the edge region: 1 second
Penetration time in untreated membrane areas: 10 sec Thus, the saturated edge regions showed a ten times higher hydrophilicity than the untreated membrane areas.

Example 2

A membrane treated in accordance with Example 1 with various concentrations of the mixture consisting of polyvinyl pyrrolidone+copolymer was installed in filter cartridges and measured accordingly. For comparative purposes, a membrane without the edge-saturated regions was installed in membrane filter cartridges.

By means of air diffusion measuring (resistance test or integral test) the wetting of these filter cartridges was then tested under the below conditions after each wetting:

a Wetting in a water bath at atmospheric pressure over a 30-minute period;

b Rinsing with water at a differential pressure of 0.5 bar over a 10-minute period;

c Rinsing with water at a differential pressure of 1.0 bar over a 10-minute period;

d Rinsing with water at a differential pressure of 4.0 bar over a 10- minute period;

e Rinsing with water at a differential pressure of 0.3 bar over a 10-minute period, and afterwards steam treatment at an overpressure of 0.5 bar over a 20-minute period, followed by renewed rinsing with water at a differential pressure of 0.3 bar over a 10-minute period.

The below Tables 1–3 show the values of the air diffusion measurements as a criterion for the varying wetting.

TABLE 1

Average values of the measured air diffusion (ml/min) of 8 filter cartridges with membranes of which their edge regions were subsequently saturated in a solution containing 1% in weight of PVP + copolymer.

| Wetting conditions | a | b | c | d | e |
|---|---|---|---|---|---|
| Filter cartridges, containing membranes with untreated edge regions | not measurable* | not measurable* | not measurable* | 81 | 17 |
| Filter cartridges, containing membranes with after-treated edge regions | 60 | 45 | 25 | 15 | 14 |

TABLE 2

Average values of the measured air diffusion (ml/min) of 8 filter cartridges with membranes of which their edge regions were subsequently saturated in a solution containing 3% in weight of PVP + copolymer.

| Wetting conditions | a | b | c | d | e |
|---|---|---|---|---|---|
| Filter cartridges, containing membranes with untreated edge regions | not measurable* | not measurable* | not measurable* | 75 | 15 |
| Filter cartridges, containing membranes with after-treated | 22 | 16 | 13 | 9 | 9 |

TABLE 3

Average values of the measured air diffusion (ml/min) of 8 filter cartridges with membranes of which their edge regions were subsequently saturated in a solution containing 6% in weight of PVP + copolymer.

| Wetting conditions | a | b | c | d | e |
|---|---|---|---|---|---|
| Filter cartridges, containing membranes with untreated | not measurable* | not measurable* | not measurable* | 68 | 18 |

TABLE 3-continued

Average values of the measured air diffusion (ml/min) of 8 filter cartridges with membranes of which their edge regions were subsequently saturated in a solution containing 6% in weight of PVP + copolymer.

| Wetting conditions | a | b | c | d | e |
|---|---|---|---|---|---|
| edge regions | able | able* | | | |
| Filter cartridges, containing membranes with after-treated edge regions | 21 | 15 | 11 | 9 | 9 |

*not measurable means that the determined value lies above the recording limit of 100 ml/min.

The filter cartridges in which are installed the membranes with saturated edge regions demonstrate distinct wetting advantages. The same effect is shown after repeating between one and two times the tests a–e, in which the filter cartridges were dried in each case prior to each new wetting.

What is claimed:

1. A process for partial modification of porous, hydrophilic filter membranes said process comprising soaking areas of a porous hydrophilic filter membrane intended to be imbedded in hydrophobic polymer material with a solution of a hydrophilizing agent, so that the porous hydrophilic filter membrane is saturated with the solution in predetermined areas to result in a saturated hydrophilic filter membrane, wherein said predetermined areas are more hydrophilic than other areas of the filter membrane, and substantially immediately thereafter washing and drying the saturated hydrophilic filter membrane, wherein prior to said soaking said porous hydrophilic filter membrane is hydrophilic to such an extent that, after one minute of having been placed on a substantially still water surface at 25° C., a surface of said porous hydrophilic filter that had come into contact with water is substantially completely wetted with water, wherein said hydrophilizing agent comprises a member selected from the group consisting of polyvinyl pyrrolidone, a polyvinyl pyrrolidone-copolymer, a peroxodisulfate and mixtures thereof, in a sufficient amount dissolved in a water/ethanol mixture, so that hydrophilic, modified areas of said filter membrane exhibit a hydrophilicity at least twice as high as other areas of said filter membrane.

2. A porous, hydrophilic filter membrane comprising predetermined areas of hydrophilic filter membrane having inside walls of pores coated with a material such that said predetermined areas are hydrophilic, wherein said predetermined areas are more hydrophilic than other areas of the filter membrane, modified areas which are hydrophilic to such an extent that one minute after having been placed on a still water surface at 25° C., a surface of said filter membrane contacting said water is substantially completely wetted with water, wherein said modified areas which are hydrophilic are more hydrophilic than said other areas of the filter membrane, whereby differences of hydrophilicity may be observed for different penetration speeds of a water drop in said modified areas compared to other areas of said filter membrane, wherein the inside walls of the pores in the hydrophilic, modified areas are coated with a hydrophilic material to such an extent that said hydrophilic modified areas of the filter membrane are at least twice as hydrophilic as other areas of the filter membrane.

3. A filtration module comprising a porous, hydrophilic filter membrane comprising predetermined areas of hydrophilic filter membrane having inside walls of pores coated with a material such that said predetermined areas are hydrophilic, wherein said predetermined areas are more hydrophilic than other areas of the filter membrane, modified areas which are hydrophilic to such an extent that one minute after having been placed on a still water surface at 25° C., a surface of said filter membrane contacting said water is substantially completely wetted with water, wherein said modified areas which are hydrophilic are more hydrophilic than said other areas of the filter membrane, whereby differences of hydrophilicity may be observed for different penetration speeds of a water drop in said modified areas compared to other areas of said filter membrane and comprising modified areas embedded in securing components comprising hydrophobic polymer material.

4. A filtration module in accordance with claim 3, wherein securing components comprise end caps of filter cartridges.

5. A filtration module in accordance with claim 3, wherein the securing components comprise polypopylene.

6. A filtration module in accordance with claim 3, wherein the securing components comprise polysulfone.

7. A filtration module in accordance with claim 3, wherein the securing components comprise polyethylene.

* * * * *